United States Patent
Shigeo et al.

(10) Patent No.: US 6,680,122 B2
(45) Date of Patent: Jan. 20, 2004

(54) CATIONIC PAINT COMPOSITION

(75) Inventors: Nishiguchi Shigeo, Hiratsuka (JP); Kamikado Koji, Yokohama (JP)

(73) Assignee: Kansai Paint Co., Ltd., Hyogo-ken (JP)

(*) Notice: Subject to any disclaimer, the term of this patent is extended or adjusted under 35 U.S.C. 154(b) by 15 days.

(21) Appl. No.: 09/994,833

(22) Filed: Nov. 28, 2001

(65) Prior Publication Data

US 2002/0119318 A1 Aug. 29, 2002

(30) Foreign Application Priority Data

Nov. 28, 2000 (JP) .................................. 2000-361900

(51) Int. Cl.⁷ .................. B32B 27/38; C25D 9/02; C08L 63/00
(52) U.S. Cl. .................. 428/413; 205/316; 205/317; 525/528
(58) Field of Search .................. 428/413, 414, 428/415, 416, 417, 418; 205/316, 317; 523/400, 457, 459, 460; 528/106, 112, 113, 119, 121; 525/418, 419, 420, 523, 528, 529, 530, 533

(56) References Cited

U.S. PATENT DOCUMENTS

| | | | |
|---|---|---|---|
| 4,396,649 A | 8/1983 | Bailey et al. | |
| 4,829,105 A | * 5/1989 | Yamada et al. | 523/415 |
| 5,095,051 A | 3/1992 | Chung et al. | |
| 5,225,461 A | 7/1993 | Kamikado et al. | |
| 5,298,148 A | 3/1994 | Yasuoka et al. | |
| 5,491,183 A | * 2/1996 | Yamada et al. | 523/404 |
| 6,353,057 B1 | * 3/2002 | He et al. | 525/124 |
| 6,492,027 B2 | * 12/2002 | Nishiguchi et al. | 428/418 |
| 6,503,629 B2 | * 1/2003 | Nishiguchi et al. | 428/413 |

FOREIGN PATENT DOCUMENTS

| | | |
|---|---|---|
| EP | 0 276 872 | 8/1988 |
| EP | 0652266 | 5/1995 |
| EP | 1 111 013 | 6/2001 |
| GB | 2 101 605 | 1/1983 |
| GB | 2 117 382 | 10/1983 |
| JP | 5-202166 | 8/1993 |
| JP | 7-126558 | 5/1995 |

* cited by examiner

Primary Examiner—Robert Dawson
Assistant Examiner—Michael Feely
(74) Attorney, Agent, or Firm—Wenderoth, Lind & Ponack, L.L.P.

(57) ABSTRACT

The present invention provides a cationic paint composition which contains, as resin component, an amino group-containing epoxy resin obtained by making an epoxy resin having an epoxy equivalent of 300–2500 react with a hydroxyl group-containing carboxylic acid, which is prepared by allowing caprolactone to react to a hydroxyl group of a hydroxy monocarboxylic acid, and with an amino group-containing compound.

15 Claims, No Drawings

CATIONIC PAINT COMPOSITION

The present invention relates to a cationic paint composition. More specifically, it relates to a cationic electrodeposition paint composition capable of forming a cured coating film which is excellent in performances such as throwing power, electrodeposition coating aptitude for rust preventive steel plate, and corrosion resistance.

Cationic electrodeposition paint composition has been used mainly as an electrodeposition paint for a wide range of uses such as undercoating of a car body. Products having various properties have been developed up to now. For example, there has been proposed a cationic electrodeposition paint composition excellent in corrosion resistance and in electrodeposition coating aptitude for rust preventive steel plate and further in adhesion, which contains, as a base resin, an epoxy resin which contains amino group and/or quaternary ammonium group as water-soluble group, and which has been internally plasticized with a plasticizer such as polyamide, polyester, polyether etc. In such a cationic electrodeposition paint composition, there are compounded, as anticorrosive pigment, lead compounds or chromium compounds, for example, lead chromate, basic lead silicate, strontium chromate, etc. Recently, however, the use of such harmful compounds as lead compounds or chromium compounds is restricted in terms of pollution problems, and the development of a cationic paint composition, excellent in corrosion resistance and containing neither lead compounds nor chromium compounds, has been strongly desired.

Since an epoxy resin which is internally plasticized with a plasticizer tends to deteriorate the corrosion resistance of a coating film, it may be considered to improve the corrosion resistance by using, as base resin, an epoxy resin containing no plasticizing modifier. There is, however, a problem that a paint composition using a non-plasticized epoxy resin has a lower electrocoating aptitude for rust preventive steel plate.

Moreover, it has been proposed to compound in an epoxy resin a plasticizer which does not deteriorate the corrosion resistance of a coating film, for example, polyol resin such as polyester polyol polyether polyol polyurethane polyol, acrylpolyol etc.; polyolefin such as polybutadiene, polyethylene, etc. There are problems, however, that these materials are not compatible enough with epoxy resin, and are not only poorly effective to improve the electrocoating aptitude for rust preventive steel plate but also deteriorate, if compounded much, the corrosion resistance of a coating film.

The inventors of the present invention have made assiduous study with a view to resolving the above-mentioned problems, and, as a result, have found out that, when a certain kind of specific amino group-containing epoxy resin is compounded, there is obtained a cationic electrodeposition paint composition which is excellent in all of throwing power, electrocoating aptitude for rust preventive steel plate and corrosion resistance in a well-balanced manner, and, thus, have completed the present invention.

Thus, according to the present invention, there is provided a cationic paint composition containing, as resin component, an amino group-containing epoxy resin obtained by the reaction of:

(A) an epoxy resin with an epoxy equivalent of 300–2,500, with
(B) a hydroxyl group-containing carboxylic acid which is obtained by making hydroxy monocarboxylic acid ($b_1$) react with caprolactone ($b_2$), and
(C) an amino group-containing compound.

In the following, the cationic paint composition provided by the present invention is described in more detail.

(A) Epoxy Resin

Epoxy resin (A) to be the main skeleton of the amino group-containing epoxy resin according to the present invention has suitably an epoxy equivalent in the range of 300–2,500, preferably 350–2,000, and more desirably 400–1,500, and a number-average molecular weight of generally at least 500, preferably in the range of 500–5,000, and more desirably 800–3,000. If the epoxy equivalent of the epoxy resin is less than 300, the corrosion resistance and throwing power of the formed cationic paint composition becomes poor. If, on the other hand, it is more than 2,500, electrocoating aptitude for the rust preventive steel plate (zinc-plated steel plate) is deteriorated.

As such an epoxy resin (A), a product obtained by a reaction of a polyphenol compound with an epihalohydrin, for example, epichlorohydrin, is preferable from a viewpoint of corrosion resistance etc. of coating film.

As a polyphenol compound usable for the formation of said polyepoxide compound, there can be mentioned, for example, bis(4-hydroxyphenyl)-2,2-propane (bisphenol A), 4,4-dihydroxy-benzophenone, bis(4-hydroxyphenyl) methane (bisphenol F), bis(4-hydroxyphenyl)-1,1-ethane, bis(4-hydroxyphenyl)-1,1-iso-butane, bis(4-hydroxy-tert-butyl-phenyl)-2,2-propane, bis(2-hydroxynaphthyl) methane, tetra(4-hydroxyphenyl)-1,1,2,2-ethane, 4,4-dihydroxydiphenylsulfone, phenol novolac, cresol novolac, etc.

As an epoxy resin obtained by the reaction of polyphenol compound and epichlorohydrin, a product derived from bisphenol A which is illustrated by the following formula:

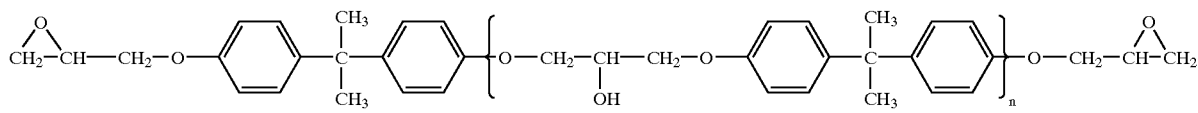

wherein n=0–8
is preferable in particular.

As such an epoxy resin available on the market, there can be mentioned, for example, products sold by Japan Epoxy Resin Co., Ltd., under the trade name of Epicote 828EL, 1002, 1004 and 1007.

(B) Hydroxyl Group-Containing Carboxylic Acid

Hydroxyl group-containing carboxylic acid which is to be made to react with the above-mentioned epoxy resin (A) in accordance with the present invention is useful for the internal plasticization of said epoxy resin, and is obtained by making hydroxy monocarboxylic acid ($b_1$) react with caprolactone ($b_2$).

Hydroxy monocarboxylic acid ($b_1$) is a compound which contains, in a molecule, at least one, preferably one or two, hydroxyl groups and a carboxylic acid. Concrete examples include glycolic acid, hydroxy pivalic acid, dimethylol propionic acid, dimethylol butanoic acid, lactic acid, glyceric acid, etc., among which glycolic acid, hydroxy pivalic acid, dimethylol propionic acid and dimethylol butanoic acid are in particular preferable.

As caprolactone ($b_2$) which is to be made to react with the above-mentioned hydroxy monocarboxylic acid ($b_1$), there can be mentioned γ-caprolactone, ε-caprolactone and δ-caprolactone, among which ε-caprolactone is especially suitable.

The above-mentioned reaction between hydroxy monocarboxylic acid ($b_1$) and caprolactone ($b_2$) may be carried out by any known method. Concretely, for instance, said reaction can be conducted by heating hydroxy monocarboxylic acid ($b_1$) and caprolactone ($b_2$) at a temperature of about 100 to about 250° C. for about one to about 15 hours in the presence of a catalyst such as titanium compound like tetrabutoxy titanium or tetrapopoxy titanium; organotin compound like tin octylate, dibutyl tin oxide or dibutyl tin laurate; and metal compound like stannous chloride.

The above-mentioned catalyst may be used in an amount of 0.5 to 1,000 ppm on the basis of the total amount of hydroxy monocarboxylic acid ($b_1$) and caprolactone ($b_2$). Caprolactone ($b_2$) may be used generally in a range of 1.5 to 15 moles, preferably 1.5 to 13 moles, more desirably 1.7 to 12 moles, per equivalent of hydroxyl group (i.e., per one hydroxyl group) of hydroxy monocarboxylic acid ($b_1$).

(C) Amino Group-Containing Compound

An amino group-containing compound (C) to be made to react with the aforementioned epoxy resin (A) in the present invention is a component to give the cationicity to cationize said epoxy resin by introducing amino group to epoxy resin substrate. There is used a compound containing at least one active hydrogen which reacts with an epoxy group.

As an amino group-containing compound used for such a purpose, there can be mentioned, for example, mono- or di-alkylamines such as monomethylamine, dimethylamine, monoethylamine, diethylamine, monoisopropylamine, diisopropylamine, trisopropylamine, monobutylamine, dibutylamine, etc.; alkanolamines such as monoethanolamine, diethanolamine, mono(2-hydroxypropyl)amine, di(2-hydroxypropyl)amine, tri(2-hydroxypropyl)amine, monomethylaminoethanol monoethyl-aminoethanol, etc.; alkylenepolyamines such as ethylenediamine, propylenediamine, butylenediamine, hexamethylenediamine, tetraethylenepentamine, pentaethylenehexamine, diethylamino-propylamine, diethylenetriamine, triethylenetetramine, etc., and ketiminized products of these polyamines; alkyleneimines such as ethyleneimine, propyleneimine, etc.; cyclic amines such as piperazine, morpholine, pyrazine, etc.

Amino Group-Containing Epoxy Resin

Amino group-containing epoxy resin which is used as vehicle in the paint composition of the present invention can be prepared by a reaction of the aforementioned epoxy resin (A) with hydroxyl group-containing carboxylic acid (B) and amino group-containing compound (C) by a known process. Reactions of hydroxyl group-containing carboxylic acid (B) and amino group-containing compound (C) to the epoxy resin (A) may be conducted in an optional order. Generally, however, it is preferable to make hydroxyl group-containing carboxylic acid (B) and amino group-containing compound (C) react to the epoxy resin (A) at the same time. The reaction of hydroxyl group-containing carboxylic acid (B) with the epoxy resin (A) is an addition reaction of carboxylic group of hydroxyl group-containing carboxylic acid (B) to epoxy group of the epoxy resin (A). The addition reaction of hydroxyl group-containing carboxylic acid (B) and amino group-containing compound (C) to epoxy resin (A) may usually be conducted in a suitable solvent at a temperature of about 80 to about 200° C., preferably about 85 to about 150° C., until the acid value of reaction mixture becomes at most 2 mgKOH/g. As the above-mentioned solvent, there can be mentioned, for example, hydrocarbons such as toluene, xylene, cyclohexane, n-hexane, etc.; esters such as methyl acetate, ethyl acetate, butyl acetate, etc.; ketones such as acetone, methyl ethyl ketone, methyl isobutyl ketone, methyl amyl ketone, etc.; amides such as dimethylformamide, dimethylacetamide, etc.; alcohols such as methanol, ethanol, n-propanol, isopropanol, etc.; and their mixtures.

Ratio of usage of each reaction component in the above-mentioned reaction is not strictly limited but can be varied suitably according to the application of the paint composition etc. The following ranges, however, based upon the total solid content weight of the three components, epoxy resin (A), hydroxyl group-containing carboxylic acid (B) and amino group-containing compound (C), are appropriate.

Epoxy Resin (A):
Generally 55–85% by weight, preferably 55–80% by weight;
Hydroxyl Group-Containing Carboxylic Acid (B):
Generally 5–30% by weight, preferably 5–25% by weight;
Amino Group-Containing Compound (C):
Generally 5–25% by weight, preferably 6–22% by weight.

Cationic Paint Composition

The cationic paint composition provided by the present invention contains as vehicle, an amino group-containing epoxy resin which is prepared in the afore-mentioned manner, and is preferably used in water-borne paint, particularly electrodeposition paint.

The amino group-containing epoxy resin according to the present invention gives a thermosetting cationic paint composition when combined with a crosslinking agent, for example, blocked polyisocyanate, melamine resin, etc., particularly blocked polyisocyanate crosslinking agent.

The above-mentioned blocked polyisocyanate crosslinking agent is an addition reaction product of a polyisocyanate compound and an isocyanate-blocking agent in an approximately stoichiometric amount. As a polyisocyanate compound used in this case, there can be mentioned, for example, aromatic, aliphatic or alicyclic polyisocyanate compounds such as tolylene diisocyanate, xylylene diisocyanate, phenylene diisocyanate, bis(isocyanatomethyl)-cyclohexane, tetramethylene diisocyanate, hexamethylene diisocyanate, methylene diisocyanate, isophoron diisocyanate, etc., and compounds containing terminal isocyanate obtained by a reaction of an excess amount of these isocyanate compounds with a low molecular active hydrogen-containing compound such as ethylene glycol, propylene glycol, trimethylolpropane, hexanetriol, castor oil, etc. These can be used either singly or in combination of two kinds or more. Among them, in particular aromatic diisocyanate, above all crude MDI, is preferable.

Crude MDI is a mixture of diphenylmethane-4,4'-diisocyanate, diphenylmethane-2,4'-diisocyanate and polymethylene polyphenyl polyisocyanate as main components. There can be mentioned, as commercial products, Cosmonate M-50, M-200, M-100, M-300, etc. (made by Mitsui Chemicals, Inc.); Sumidur 44V10, 44V20, 44V40, etc. (made by Sumika Bayer Urethane Co., Ltd.); Lupranate M-12, M-12S, M-20, M20S, etc. (made by BASF, Germany); Mondur MR (LIGHT) etc. (made by Bayer), etc.

On the other hand, the afore-mentioned isocyanate blocking agent is a substance to be added to, and to block, an isocyanate group of a polyisocyanate compound, and the blocked polyisocyanate compound formed by the addition is desirably stable at normal temperature, and capable of reproducing a free isocyanate group, dissociating the blocking agent, at the time of being heated to a baking temperature (usually about 100-about 200° C.) of the coating film. As a blocking agent meeting such requirements, there can be mentioned, for example, lactam type compounds such as ε-caprolactam, γ-butyrolatam, etc.; oxime type compounds such as methyl ethyl ketoxime, cyclohexanone oxime, etc.; phenol type compounds such as phenol, p-t-butylphenol, cresol, etc.; aliphatic alcohols such as n-butanol, 2-ethylhexanol, etc.; aromatic alkyl alcohols such as phenylcarbinol, methyl-phenylcarbinol, etc.; ether alcohol type compounds such as ethylene glycol monobutyl ether, etc.

Compounding ratio of an amino group-containing epoxy resin and a blocked polyisocyanate crosslinking agent can generally be in the range of 50–80% by weight, preferably 55–75% by weight, and more desirably 55–70% by weight of the amino group-containing epoxy resin, and generally 50–20% by weight, preferably 45–25% by weight, and more desirably 45–30% by weight of the blocked polyisocyanate crosslinking agent, based upon the total solid content weight of both components.

The cationic paint composition of the present invention containing the above-mentioned amino group-containing epoxy resin and a blocked polyisocyanate crosslinking agent can be prepared, for example, by sufficiently mixing the amino group-containing epoxy resin and the blocked polyisocyanate crosslinking agent, and then by water-solubilization or water-dispersing of said epoxy resin through neutralization with a water-soluble organic carboxylic acid usually in an aqueous medium. As an organic carboxylic acid for neutralization, particularly acetic acid, formic acid or their mixture is preferable. By using these acids, finishing property, throwing power and low temperature curability of the formed paint composition and stability of the paint are improved.

In the paint composition of the present invention, a bismuth compound can be included as anticorrosive agent. There is no restriction in the kind of bismuth compound to be compounded. Examples are inorganic bismuth compounds such as bismuth oxide, bismuth hydroxide, basic bismuth carbonate, bismuth nitrate, bismuth silicate, etc., among which, particularly bismuth hydroxide is preferable.

Moreover, it is possible to use, as a bismuth compound, an organic bismuth salt which is prepared by a reaction of a bismuth compound as mentioned above and two or more kinds of organic acids, at least one of which is an aliphatic hydroxycarboxylic acid. As an organic acid usable for the preparation of said organic bismuth salt, there can be mentioned, for example, glycolic acid, glyceric acid, lactic acid, dimethylolpropionic acid, dimethy-lolbutyric acid, dimethylolvaleric acid, tartaric acid, malic acid, hydroxymalonic acid, dihydroxysuccinic acid, trihydroxysuccinic acid, methylmalonic acid, benzoic acid, citric acid, etc.

The above-mentioned inorganic bismuth compounds and organic bismuth salts can each be used, either singly or in combination of two kinds or more.

Content of these bismuth compounds in the paint composition of the present invention is not strictly limited but can be varied in a wide range according to the performances required of the paint etc. Usually, however, less than 10% by weight, preferably the range of 0.05–5% by weight, based upon the resin solid content in the paint composition of the present invention, is appropriate.

The cationic paint composition of the present invention can further contain, optionally, a tin compound as a curing catalyst. As said tin compound, there can be mentioned, for example, organotin compounds such as dibutyltin oxide, dioctyltin oxide, etc.; aliphatic or aromatic carboxylates of dialkyltin such as dibutyltin dilaurate, dioctyltin dilaurate, dibutyltin diacetate, dioctyltin benzoateoxy, dibutyltin benzoateoxy, dioctyltin dibenzoate, dibutyltin dibenzoate, etc., among which dialkyltin aromatic carboxylates etc. are preferable from the viewpoint of low temperature curability.

The content of such a tin compound in the paint composition of the present invention is not strictly prescribed but can be varied in a wide range according to the performances required of the paint etc. The tin content, however, is preferably in the range of usually 0.01–8 parts by weight, preferably 0.05–5 parts by weight per 100 parts by weight of the resin solid content in the paint.

In the cationic paint composition of the present invention, there can be further compounded, if necessary, additives for paint such as color pigment, extender pigment, anticorrosive pigment, organic solvent, pigment dispersing agent, surface adjustment agent, etc.

The cationic paint composition of the present invention is applied onto the surface of a desired substrate by cationic electrodeposition coating. The electrodeposition coating can be conducted generally in an electrodeposition bath comprising the paint composition of the present invention which has been diluted with deionized water etc. so that the solid content concentration may become about 5–about 40% by weight, preferably 15–25% by weight, and pH of which has been adjusted in the range of 5.5–9 under the condition of the bath temperature usually set at about 15–about 35° C. and the load voltage at 100–450V.

The film thickness of the electrodeposition coating film formed by using the paint composition of the present invention is not particularly limited, but is preferably generally in the range of 10–45 μm, particularly 15–30 μm, based upon a cured coating film. The baking temperature of the coating film is suitably generally in the range of about 120–about 200° C., preferably about 140–about 180° C., at the surface of the substrate. The baking time can be about 5–60 minutes, preferably about 10–30 minutes.

The cationic paint composition of the present invention is used preferably as cationic electrodeposition paint. Besides it can also be used as solvent type paint, as an anticorrosive primer for a steel plate to be coated by means of electrodeposition coating, roller coating, etc.

Furthermore, the paint composition of the present invention is usable as two-liquid type, room temperature-drying paint with polyisocyanate compound or melamine resin as crosslinking agent or adhesive.

The cationic paint composition of the present invention forms a cured coating film excellent in corrosion resistance, electrocoating aptitude for rust preventive steel plate and adhesion to the substrate, and is useful, for example, as undercoat paint for car body, car parts, and in the field of construction and architecture, etc.

Especially, of a cationic electrodeposition paint, a throwing power is required as a rust preventive countermeasure for baggy parts of a car body (locker, side-sill, pillar). Higher throwing power is being required because of more and more complicated body structure which has been caused by reinforcement member provided in locker part and side-sill too meet the recent demand for better safety.

The cationic paint composition of the present invention has a high throwing power, and can form an electrodeposition coating film excellent in corrosion resistance with excellent electrodeposition coating aptitude even for a car body with complicated structure.

In the following, the present invention is described more specifically by working examples. The present invention shall however, not be restricted to these examples in any way. "Part" and "%" means "part by weight" and "% by weight", respectively.

PRODUCTION EXAMPLE 1

A flask was fed with 148 g of dimethylol butanoic acid and 325 g of ε-caprolactone. After dimethylol butanoic acid was dissolved at 120° C., 0.05 g of tetrabutoxy titanium was added, and the temperature was raised to 170° C. Sampling was conducted with time with this temperature maintained, and the amount of unreacted ε-caprolactone was monitored by the measurement of samples for infrared absorption spectrum. When the reaction rate became at least 98%, the reaction mixture was cooled, and, thus, modifier 1 was obtained.

To 100 g of Epicote 828EL (trade name of epoxy resin having an epoxy equivalent of 90 and a molecular weight of 350, made by Japan Epoxy Resin Co., Ltd.,), 400 g of bisphenol A and 0.2 g of dimethylbenzylamine were added, and allowed to react at 130° C. until epoxy equivalent became 750.

Then, to 200 g of the modifier 1, 116 g of diethanolamine and 65 g of ketiminized diethylenetriamine (solid content: 84%) were added, and allowed to react at 120° C. for 4 hours. Thereafter, 414 g of butyl cellosolve was added, and, thus, there was obtained cationic resin No. 1 with an amine value of 46 and a solid content of 80%.

PRODUCTION EXAMPLE 2

Modifier 2 was produced in the same manner as in Production Example 1 except that the use amount of ε-caprolactone was changed to 1852 g, and that the use amount of tetrabutoxy titanium was changed to 0.2 g.

Separately, to 1000 g of Epicote 828EL (trade name of epoxy resin having an epoxy equivalent of 90 and a molecular weight of 350, made by Japan Epoxy Resin Co., Ltd.), 400 g of bisphenol A and 0.2 g of dimethylbenzylamine were added, and allowed to react at 130° C. until epoxy equivalent became 750.

Then, 200 g of modifier 2, 147 g of diethanolamine and 65 g of ketiminized diethylenetriamine (solid content: 84%) were added, and allowed to react at 120° C. for 4 hours. Thereafter, 414 g of butyl cellosolve was added, and, thus, there was obtained cationic resin No. 2 with an amine value of 55 and a solid content 80%.

PRODUCTION EXAMPLE 3

To 118 g of hydroxypivalic acid, 382 g of ε-caprolactone was added. After hydroxypivalic acid was dissolved at 120° C., 0.05 g of tetrabutoxy titanium was added, and the temperature was raised to 170° C. Sampling was conducted with time with this temperature maintained, and the amount of unreacted ε-caprolactone was monitored by the measurement of samples for infrared absorption spectrum. When the reaction rate became at least 98%, the reaction mixture was cooled, and, thus, modifier 3 was obtained.

To 1000 g of Epicote 828EL (trade name of epoxy resin having an epoxy equivalent of 90 and a molecular weight of 350, made by Japan Epoxy Resin Co., Ltd.,), 400 g of bisphenol A and 0.2 g of dimethylbenzylamine were added, and allowed to react at 130° C. until epoxy equivalent became 750.

Then, to 200 g of the modifier 3, 116 g of diethanolamine and 65 g of ketiminized diethylenetriamine (solid content: 84%) were added, and allowed to react at 120° C. for 4 hours. Thereafter, 414 g of butyl cellosolve was added, and, thus, there was obtained cationic resin No. 3 with an amine value of 46 and a solid content of 80%.

PRODUCTION EXAMPLE 4

To 1010 g of Epicote 828EL (trade name of epoxy resin having an epoxy equivalent of 90 and a molecular weight of 350, made by Japan Epoxy Resin Co., Ltd.), 390 g of bisphenol A and 0.2 g of dimethylbenzylamine were added, and allowed to react at 130° C. until epoxy equivalent became 800.

Then, 160 g of diethanolamine and 65 g of ketiminized diethylenetriamine were added, and allowed to react at 120° C. for 4 hours. Thereafter, 355 g of butyl cellosolve was added, and, thus, there was obtained resin No. 4 with an amine value of 67 and a solid content of 80%.

PRODUCTION EXAMPLE 5

To 270 g of Comonate M-200 (trade name of crude MDI made by Mitsui Chemicals, Inc.), 46 g of methyl isobutyl ketone was added, and temperature was raised to 70° C. Then, after 281 g of diethylene glycol monoethyl ether was slowly added, temperature was raised to 90° C. Sampling was conducted with time while keeping the temperature, and, by confirming that the absorption of unreacted isocyanate was not observed any more in infrared absorption spectrum measurement of samples, there was obtained a blocked polyisocyanate A having a solid content 90%.

PRODUCTION EXAMPLE OF CLEAR EMULSION (a) FOR CATIONIC ELECTRODEPOSITION

After 87.5 g (70 g as resin solid content) of the resin No. 1 obtained in the above-mentioned Production Example 1, 33.3 g (30 g as resin solid content) of the blocked polyisocyanate A obtained in production example 5, 2.5 g of liquid organotin compound (dibutyltin dibenzoate having a solid content of 40%, made by Sankyo Organic Chemicals Co., Ltd.) and 15 g of 10% acetic acid were mixed and stirred homogeneously, 156 g of deionized water was added dropwise over a period of about 15 minutes with vigorous stirring, and, thus, there was obtained a clear emulsion (a) for cationic electrodeposition with a solid content of 34%.

PRODUCTION EXAMPLE OF CLEAR EMULSIONS (b) TO (d) FOR CATIONIC ELECTRODEPOSITION

Clear emulsions (b) to (d) were obtained in the same manner as in the Production Example of emulsion (a) except that cationic resin No. 1 was replaced with cationic resins Nos. 2 to 4 which had been produced in Production Examples 2 to 4 respectively.

Preparation of Pigment Dispersion Paste

To 5.83 parts of 60% quaternary epoxy resin chloride, 14.5 parts of titanium white, 0.4 part of carbon black, 7.0 parts of extender pigment and 2.0 parts of bismuth hydroxide, there was added 2.24 parts of deionized water, and the resultant mixture was stirred sufficiently, and, thus, there was obtained pigment dispersion paste with a solid content of 55%.

EXAMPLES AND COMPARATIVE EXAMPLES

Example 1

To 297 parts of the clear emulsion (a), there were added 61.3 parts of the pigment dispersion paste and 315.2 parts of deionized water, and, thus, there was obtained cationic electrodeposition paint No. 1 with a solid content of 20%.

Examples 2–3 and Comparative Examples 1

In the same manner as in Example 1, pigment dispersion paste and deionized water were added to each of the clear emulsions (b)–(d) at a compounding proportion which is shown in Table 1 below, and, thus, there were obtained the cationic electrodeposition paints No. 2–No. 4 each with a solid content of 20%.

TABLE 1

Formulation of cationic electrodeposition paints

|  | Example 1 | Example 2 | Example 3 | Comp. Example 1 |
|---|---|---|---|---|
| Cationic electro-deposition paint | NO. 1 | NO. 2 | NO. 3 | NO. 4 |
| 34% Emulsion | (a) | (b) | (c) | (d) |
| Compounded amount (Solid content) | 297 (101) | 297 (101) | 297 (101) | 297 (101) |
| Compounded amount of 55% pigment dispersion paste (Solid content) | 61.3 (33.7) | 61.3 (33.7) | 61.3 (33.7) | 61.3 (33.7) |
| Deionized water | 158.7 | 158.7 | 158.7 | 158.7 |
| 20% Cationic electrodeposition paint (Solid content) | 673.5 (134.7) | 673.5 (134.7) | 673.5 (134.7) | 673.5 (134.7) |

Coating Test

Zinc-plated steel plate of 0.8 mm×150 mm×70 mm which had been chemically treated with Palbond #3080 (trade name of zinc phosphate treating agent made by Nihon Parkerizing Company) was dipped in each cationic electrodeposition paint obtained in the above-mentioned Examples and Comparative Examples, and, then, electrodeposition coating was conducted by using the plate as cathode (coating voltage of rust preventive steel plate: 270V). Thus formed electrodeposition coating film was baked at 170° C. for 20 minutes by using an electric hot air drier. Performance test results of the obtained coated plates are shown in the following Table 2.

TABLE 2

Test results

| | | Example 1 | Example 2 | Example 3 | Comp. Example 1 |
|---|---|---|---|---|---|
| Coating film performance | Electrocoating aptitude for rust preventive steel plate (*1) | ○ | ○ | ○ | X |
| | Corrosion resistance (*2) | ○ | ○ | ○ | ○ |
| | Impact resistance (*3) | 50< | 50< | 50< | 30 |
| | Secondary adhesive property (*4) | ○ | ○ | ○ | Δ |
| | Bending resistance (*5) | ○ | ○ | ○ | X |

Performance tests were conducted according to the following methods.

(*1) Electrocoating Aptitude for Rust Preventive Steel Plate

The number of pinholes was counted in an area of 10 cm×10 cm of the test piece of zinc-plated steel plate which had been dipped in an electrodeposition bath as cathode and coated under the voltage of 270V at a bath temperature of 28° C.

○: No pinhole generated.

Δ: 3–5 pinholes generated.

X: More than 10 pinholes generated.

(*2) Corrosion Resistance

Cross-cut lines were made on the electrodeposition coating film of each electrodeposition coated plate, which had been obtained by baking at 170° C. for 20 minutes, with a knife reaching to the ground surface. Thus treated plates were subjected to salt water spray tests according to JIS Z-2371 for 840 hours, and evaluated by the rust and blister width from the knife scratch according to the following standard.

○: Maximum width of rust or blister is less than 2 mm from the cut part (one side).

Δ: Maximum width of rust or blister is more than 2 mm and less than 3 mm from the cut part (one side), and blistering is observed all over the coated surface.

X: Maximum width of rust or blister is more than 3 mm from the cut part, and blistering is observed all over the coated surface.

(*3) Impact Resistance (DuPont Method)

Test plate, which had been obtained by baking at 170° C. for 20 minutes, was kept in a thermo-hygrostat room at a temperature of 20±1° C. and at a humidity of 75±2% for 24 hours. Thereafter, a stand and an impact point of the prescribed size were attached to a DuPont impact test machine, and, then, the test plate was inserted therebetween with the coated side up. Then, a weight of the prescribed weight was fallen onto the impact point. Thus, there was measured maximum height at which no cracking or chipping was caused by impact on the coating film.

(*4) Secondary Adhesive Property

On the coated surface of the coated plate obtained by the afore-mentioned coating test, TP-37 Grey (trade name of aminoalkyd type intermediate paint made by Kansai Paint Co., Ltd.) and NEO AMILAC 6000 (trade name of aminoalkyd type topcoat paint made by Kansai Paint Co., Ltd.) were further applied in order. The plate was baked and cured, and was then soaked in warm water of 40° C. for 240 hours. Thereafter, the plate was given 2 mm×2 mm cross-cuts, and was subjected to Cellotape® peeling test. Thus, the remaining rate (number of remaining pieces/100) on the coating film was evaluated.

○: 100/100

Δ: 90–99/100

X: 89/100 or less (*5) Bending Resistance

After kept in a thermo-hygrostat room at a temperature of 20±1° C. and at a humidity of 75+2% for 24 hours, the test plate was bent to 180° in 1–2 seconds.

○: No abnormality was observed on both surfaces at the bent part

X: Abnormality such as cracking, chipping, etc. was observed at least on one side.

What is claimed is:

1. A cationic paint composition containing
   (i) an amino group-containing epoxy resin obtained by a reaction of:
      (A) an epoxy resin having an epoxy equivalent of 300–2,500, with
      (B) a hydroxyl group-containing carboxylic acid which is obtained by making hydroxy monocarboxylic acid ($b_1$) react with caprolactone ($b_2$), and
      (C) an amino group-containing compound; and
   (ii) a blocked polyisocyanate crosslinking agent, the amount of said epoxy resin (i) being in the range of 50–80% by weight, based on the total solid content of the epoxy resin (i) and the crosslinking agent (ii).

2. A cationic paint composition set forth in claim 1 wherein the epoxy resin (A) is obtained by a reaction of a polyphenol compound and an epihalohydrin.

3. A cationic paint composition set forth in claim 2 wherein the polyphenol compound is bisphenol A.

4. A cationic paint composition set forth in claim 1 wherein the epoxy resin (A) has an epoxy equivalent in the range of 350–2,000.

5. A cationic paint composition set forth in claim 1 wherein hydroxy monocarboxylic acid ($b_1$) is selected from the group consisting of glycolic acid, hydroxy pivalic acid, dimethylol propionic acid, dimethylol butanoic acid, lactic acid and glyceric acid.

6. A cationic paint composition set forth in claim 1 wherein hydroxy monocarboxylic acid ($b_1$) is selected from the group consisting of glycolic acid, hydroxy pivalic acid, dimethylol propionic acid and dimethylol butanoic acid.

7. A cationic paint composition set forth in claim 1 wherein caprolactone ($b_2$) is $\epsilon$-caprolactone.

8. A cationic paint composition set forth in claim 1 wherein hydroxyl group-containing carboxylic acid is obtained by making 1.5 to 15 moles of caprolactone ($b_2$) react per equivalent of hydroxyl group of hydroxy monocarboxylic acid ($b_1$).

9. A cationic paint composition set forth in claim 1 wherein amino group-containing epoxy resin is prepared from a reaction of 55–85% by weight of epoxy resin (A), 5–30% by weight of hydroxyl group-containing carboxylic acid (B) and 5–25% by weight of amino group-containing compound (C), each proportion being based upon the weight of total solid content of said three components (A), (B) and (C).

10. A cationic paint composition set forth in claim 1 wherein amino group-containing epoxy resin is prepared from a reaction of 55–80% by weight of epoxy resin (A), 5–25% by weight of hydroxyl group-containing carboxylic acid (B) and 6–22% by weight of amino group-containing compound (C), each proportion being based upon the weight of total solid content of said three components (A), (B) and (C).

11. A cationic paint composition set forth in claim 1 which further contains bismuth compound as anticorrosive agent.

12. A cationic paint composition set forth in claim 1 wherein the epoxy resin (A) is obtained by a reaction of a bisphenol compound and an epihalohydrin.

13. A cationic electrodeposition bath comprising the cationic paint composition set forth in claim 1.

14. A cationic electrodeposition coating process characterized by using the cationic paint composition set forth in claim 1.

15. An article coated by using the cationic paint composition set forth in claim 1.

* * * * *